(12) United States Patent
Liu et al.

(10) Patent No.: US 12,136,875 B2
(45) Date of Patent: Nov. 5, 2024

(54) SWITCHED CAPACITOR VOLTAGE CONVERTER CIRCUIT AND SWITCHED CAPACITOR VOLTAGE CONVERSION METHOD

(71) Applicant: Richtek Technology Corporation, Zhubei (TW)

(72) Inventors: Kuo-Chi Liu, Hsinchu (TW); Ta-Yung Yang, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 248 days.

(21) Appl. No.: 18/049,622

(22) Filed: Oct. 25, 2022

(65) Prior Publication Data

US 2023/0179093 A1 Jun. 8, 2023

Related U.S. Application Data

(60) Provisional application No. 63/287,483, filed on Dec. 8, 2021.

(30) Foreign Application Priority Data

Jun. 7, 2022 (TW) .................................. 111121086

(51) Int. Cl.
*H02M 3/07* (2006.01)
*H02M 1/00* (2006.01)
*H02M 3/00* (2006.01)

(52) U.S. Cl.
CPC ........... *H02M 3/07* (2013.01); *H02M 1/0009* (2021.05); *H02M 3/015* (2021.05)

(58) Field of Classification Search
CPC ...... H02M 3/07; H02M 1/0009; H02M 3/015; H02M 1/0095; H02M 1/10; H02M 1/0058; H02M 3/158; Y02B 70/10
See application file for complete search history.

(56) References Cited

U.S. PATENT DOCUMENTS

| | | | |
|---|---|---|---|
| 8,351,228 B2 * | 1/2013 | Izumi | H02M 3/07 363/60 |
| 9,667,139 B2 * | 5/2017 | Giuliano | H02M 3/158 |
| 9,917,517 B1 * | 3/2018 | Jiang | H02M 1/34 |
| 10,063,146 B1 * | 8/2018 | Lee | G01R 19/003 |
| 10,651,731 B1 * | 5/2020 | Rainer | H02M 3/1588 |

(Continued)

*Primary Examiner* — Yusef A Ahmed
(74) *Attorney, Agent, or Firm* — Tung & Associates

(57) ABSTRACT

A switched capacitor voltage converter circuit includes: a switched capacitor converter and a control circuit. In a charging process of a resonant operation mode, the switches in the switched capacitor converter operate to form a series connection of at least one capacitor and an inductor between a first voltage and a second voltage, as a charging path. In a discharging process of the resonant operation mode, the switches operate to form a series connection of each capacitor and the inductor between the second voltage and a ground level, thus forming plural discharging paths simultaneously or sequentially. In an inductor switching mode, the switches operate to couple one end of the inductor to the first voltage or the ground level alternatingly. The control circuit decides to operate in the resonant operation mode or the inductor switching mode according to the first voltage, thereby maintaining the second voltage within a predetermined range.

20 Claims, 8 Drawing Sheets

(56) References Cited

U.S. PATENT DOCUMENTS

| | | | |
|---|---|---|---|
| 11,165,335 B2* | 11/2021 | Sblano | H02M 3/1584 |
| 2002/0054499 A1* | 5/2002 | Tanaka | H02M 7/4826 |
| | | | 363/132 |
| 2011/0175591 A1* | 7/2011 | Cuk | H02M 3/158 |
| | | | 323/311 |
| 2019/0028025 A1* | 1/2019 | Babazadeh | H01L 27/088 |
| 2020/0177081 A1* | 6/2020 | Huang | H02M 3/07 |
| 2020/0204071 A1* | 6/2020 | Huang | H02M 3/07 |
| 2021/0328507 A1* | 10/2021 | Liu | H02M 1/0095 |
| 2021/0351695 A1* | 11/2021 | Liu | H02M 3/155 |
| 2021/0367511 A1* | 11/2021 | Liu | H02M 3/01 |
| 2021/0367520 A1* | 11/2021 | Liu | H02M 3/158 |
| 2021/0376717 A1* | 12/2021 | Liu | H02M 3/01 |
| 2021/0384820 A1* | 12/2021 | Liu | H02M 1/007 |
| 2021/0399621 A1* | 12/2021 | Liu | H02M 3/01 |
| 2022/0029531 A1* | 1/2022 | Liu | H02M 3/01 |
| 2022/0140726 A1* | 5/2022 | Liu | H02M 1/0095 |
| | | | 323/271 |
| 2022/0352816 A1* | 11/2022 | Liu | H02M 3/07 |
| 2022/0368218 A1* | 11/2022 | Liu | H02M 3/01 |
| 2023/0028873 A1* | 1/2023 | Liu | H02M 3/07 |
| 2023/0170795 A1* | 6/2023 | Yoo | H02M 1/08 |
| | | | 323/271 |
| 2023/0223843 A1* | 7/2023 | Liu | H02M 1/083 |
| | | | 363/21.02 |
| 2023/0246548 A1* | 8/2023 | Liu | H02M 3/07 |
| | | | 323/271 |
| 2023/0361674 A1* | 11/2023 | Liu | H02M 3/158 |
| 2023/0396162 A1* | 12/2023 | Liu | H02M 1/0095 |
| 2023/0412073 A1* | 12/2023 | Ge | H02M 3/077 |
| 2024/0072633 A1* | 2/2024 | Liu | H02M 3/07 |

* cited by examiner

SWITCHED CAPACITOR VOLTAGE CONVERTER CIRCUIT AND SWITCHED CAPACITOR VOLTAGE CONVERSION METHOD

CROSS REFERENCE

The present invention claims priority to U.S. 63/287,483 filed on Dec. 8, 2021 and claims priority to TW 111121086 filed on Jun. 7, 2022.

BACKGROUND OF THE INVENTION

Field of Invention

The present invention relates to a switched capacitor voltage converter circuit; particularly, it relates to such switched capacitor voltage converter circuit capable of automatically switching among different operation modes. The present invention also relates to a switched capacitor voltage conversion method.

Description of Related Art

Please refer to FIG. 1, which shows a schematic diagram of a conventional resonant switched capacitor voltage converter 10. This conventional resonant switched capacitor voltage converter 10 has an input-to-output voltage conversion ratio (i.e. input voltage Vin to output voltage Vout) of 2:1. This conventional resonant switched capacitor voltage converter 10 can operate in high efficiency when the switches of this conventional resonant switched capacitor voltage converter 10 operate at resonant frequency and achieve soft switching such as zero current switching or zero voltage switching. However, the prior art shown in FIG. 1 has a drawback that: because its voltage conversion ratio is fixed at 2:1, when the input voltage varies in a wide range, its output voltage Vout will vary in a wide range.

In view of the above, the present invention proposes an innovative switched capacitor voltage converter circuit to overcome the drawbacks in the prior art.

SUMMARY OF THE INVENTION

From one perspective, the present invention provides a switched capacitor voltage converter circuit, which is configured to operably convert a first voltage to a second voltage or convert the second voltage to the first voltage; the switched capacitor voltage converter circuit comprising: a switched capacitor converter coupled between the first voltage and the second voltage; and a control circuit, which is configured to operably generate a control signal for controlling the switched capacitor converter, so as to convert the first voltage to the second voltage or convert the second voltage to the first voltage; wherein the switched capacitor converter includes: at least one capacitor; a plurality of switches, which are coupled to the at least one capacitor; and at least one inductor; wherein the control circuit is configured to operably select a ratio of the first voltage to the second voltage according to a level of the first voltage, so that the second voltage is maintained at a first predetermined range, and to generate the control signal accordingly, so as to convert the first voltage to the second voltage, or, wherein the control circuit is configured to operably select the ratio of the first voltage to the second voltage according to a level of the second voltage, so that the first voltage is maintained at a second predetermined range, and to generate the control signal accordingly, so as to convert the second voltage to the first voltage; wherein the control signal includes: a charging operation signal and at least one discharging operation signal; wherein in a charging process of a resonant operation mode, the charging operation signal is configured to operably control the plurality of switches, so that a series connection of the at least one capacitor and the inductor is formed between the first voltage and the second voltage, to form a charging path and operate in resonant operation; wherein in at least one discharging process of the resonant operation mode, the at least one discharging operation signal is configured to operably control the plurality of switches, so that a series connection of each respective capacitor and the inductor is formed between the second voltage and a DC voltage level, to simultaneously or sequentially form a plurality of discharging paths and operates in resonant operation; wherein in the resonant operation mode, the charging operation signal and the at least one discharging operation signal have respective ON periods which do not overlap one another, so that the charging process and the at least one discharging process do not overlap each other; wherein in the resonant operation mode, the charging process and the at least one discharging process are arranged in a repeated, alternating order, so as to convert the first voltage to the second voltage or convert the second voltage to the first voltage.

In one embodiment, the control signal further includes an inductor operation signal, which is configured to operably control the plurality of switches, so that the switched capacitor converter operates in an inductor switching mode, whereby one end of the at least one inductor is alternatingly coupled to the first voltage or the DC voltage level, so as to convert the first voltage to the second voltage and maintain the second voltage within the first predetermined range or to convert the second voltage to the first voltage and maintain the first voltage within the second predetermined range.

In one embodiment, in the resonant operation mode and/or in the inductor switching mode, the control circuit reduces a duty ratio of one or more of (1) to (3): (1) the charging operation signal; (2) the discharging operation signal; and/or (3) the inductor operation signal, so that when a part of the plurality of switches are ON, an inductor current flowing toward the second voltage is in a first state and so that when all of the plurality of switches are OFF, the inductor current flowing through the inductor continues flowing along at least one continuing current flow path and the inductor current flowing toward the second voltage is in a second state, whereby the inductor performs inductive power conversion to switch between the first state and the second state.

In one embodiment, in the resonant operation mode, the first state is that the inductor current flowing toward the second voltage is a resonant current.

In one embodiment, in the inductor switching mode, the first state is that the inductor current flowing toward the second voltage is a non-resonant current.

In one embodiment, in the inductor switching mode, the first state is that the inductor current flowing toward the second voltage is a triangle wave current.

In one embodiment, the second state is that the inductor current flowing toward the second voltage is a non-resonant current.

In one embodiment, the second state is that the inductor current flowing toward the second voltage is a linear ramp current.

In one embodiment, in the resonant operation mode and/or in the inductor switching mode, the control circuit reduces a duty ratio of one or more of (1) to (3): (1) the charging operation signal; (2) the discharging operation signal; and/or (3) the inductor operation signal, so that when all of the plurality of switches are OFF, one end of the inductor is conducted to the DC voltage level through the body diode of at least one switch, whereby the inductor current flowing toward the second voltage is the linear ramp current.

In one embodiment, the at least one capacitor includes two capacitors, and wherein the resonant operation mode includes a 2-to-1 mode and/or a 3-to-1 mode; wherein the control circuit decides to control the switched capacitor converter to operate in the 2-to-1 mode or the 3-to-1 mode according to the first voltage; wherein in the 2-to-1 mode, the control circuit controls the plurality of switches, so that in the charging process, one of the capacitors and one corresponding inductor form the charging path and operate in resonant operation and so that in the discharging process, the one capacitor and the one corresponding inductor form the discharging path and operate in resonant operation; wherein in the 3-to-1 mode, the control circuit controls the plurality of switches, so that in the charging process, the two capacitors and one corresponding inductor form the charging path and operate in resonant operation and so that in the discharging process, the two capacitors and the one corresponding inductor form the discharging path and operate in resonant operation; wherein in the 2-to-1 mode, the first voltage is 2-fold of the second voltage, and wherein in the 3-to-1 mode, the first voltage is 3-fold of the second voltage.

In one embodiment, the control circuit decides to control the switched capacitor converter to operate in one of (1) to (3) according to the first voltage: (1) the 2-to-1 mode; (2) the 3-to-1 mode; or (3) the inductor switching mode, so as to maintain the second voltage within the first predetermined range.

In one embodiment, the inductor switching mode includes: a 2-level inductor switching mode and/or a 3-level inductor switching mode, and the inductor operation signal includes: a 2-level inductor operation signal and/or a 3-level inductor operation signal. In the 2-level inductor switching mode, the 2-level inductor operation signal control the plurality of switches, so that a voltage at the one end of the at least one inductor is periodically switched between the first voltage and the DC voltage level, so as to convert the first voltage to the second voltage or convert the second voltage to the first voltage. In the 3-level inductor switching mode, the 3-level inductor operation signal control the plurality of switches, so that the voltage at the one end of the at least one inductor is periodically switched among the first voltage, ½-fold of the first voltage and the DC voltage level, so as to convert the first voltage to the second voltage or convert the second voltage to the first voltage.

In one embodiment, the control circuit decides to control the switched capacitor converter to operate in one of (1) to (4) according to the first voltage: (1) the 2-to-1 mode; (2) the 3-to-1 mode; (3) the 2-level inductor switching mode; or (4) the 3-level inductor switching mode, so as to maintain the second voltage within the first predetermined range.

In one embodiment, in the 2-to-1 mode, the first voltage is 2-fold of the second voltage, and wherein in the 3-to-1 mode, the first voltage is 3-fold of the second voltage.

In one embodiment, the switched capacitor voltage converter includes: a series-parallel switched capacitor converter.

In one embodiment, the series-parallel switched capacitor converter includes: a 2-to-1 series-parallel switched capacitor converter, a 3-to-1 series-parallel switched capacitor converter, a 4-to-1 series-parallel switched capacitor converter or 5-to-1 series-parallel switched capacitor converter.

In one embodiment, the DC voltage level is a ground level.

In one embodiment, the control circuit includes: a current sensing circuit, which is configured to operably sense a current flowing through the at least one inductor, to generate at least one current sensing signal; and a control signal generation circuit coupled to the current sensing circuit, wherein the control signal generation circuit is configured to operably generate the control signal according to the at least one current sensing signal.

In one embodiment, the control circuit further includes: a voltage sensing circuit, which is configured to operably sense the second voltage or the first voltage, to generate a voltage sensing signal; wherein in the inductor switching mode, the control signal generation circuit is configured to operably generate the inductor operation signal further according to the voltage sensing signal.

In one embodiment, the at least one capacitor includes N capacitors, and the resonant operation mode includes a M-to-1 mode, wherein N is a natural number greater than three, and wherein M is a natural number greater than two and smaller than and equal to N+1; wherein the control circuit determines a value of M according to the first voltage and the control circuit decides to control the switched capacitor converter to operate in the M-to-1 mode accordingly; wherein in the M-to-1 mode, the control circuit controls the plurality of switches, so that in the charging process, M−1 capacitors and one corresponding inductor form the charging path and operate in resonant operation and so that in the discharging process, the M−1 capacitors and the one corresponding inductor form the discharging path and operate in resonant operation.

From another perspective, the present invention provides a switched capacitor voltage conversion method configured to operably convert a first voltage to a second voltage or convert the second voltage to the first voltage of a switched capacitor voltage converter, wherein the switched capacitor converter includes: at least one capacitor; a plurality of switches, which are coupled to the at least one capacitor; and at least one inductor; the switched capacitor voltage conversion method comprising: electing a ratio of the first voltage to the second voltage according to a level of the first voltage, so that the second voltage is maintained at a first predetermined range, and generating the control signal accordingly, so as to convert the first voltage to the second voltage, or, selecting the ratio of the first voltage to the second voltage according to a level of the second voltage, so that the first voltage is maintained at a second predetermined range, and generating the control signal accordingly, so as to convert the second voltage to the first voltage; wherein in a charging process of a resonant operation mode, the charging operation signal is configured to operably control the plurality of switches, so that a series connection of the at least one capacitor and the inductor is formed between the first voltage and the second voltage, to form a charging path and operate in resonant operation; wherein in at least one discharging process of the resonant operation mode, the at least one discharging operation signal is configured to operably control the plurality of switches, so that a series connection of each respective capacitor and the inductor is formed between the second voltage and a DC voltage level, to simultaneously or sequentially form a plurality of discharging paths and operate in resonant operation; wherein in the resonant operation mode, the charging operation signal and the at least one discharging operation signal have respective ON periods which do not overlap one another, so that the charging process and the at least one discharging process do not overlap each other; wherein in the resonant operation mode, the charging process and the at least one discharging processes are arranged in a repeated, alternating order, so as to convert the first voltage to the second voltage or convert the second voltage to the first voltage.

In one embodiment, the switched capacitor voltage conversion method further comprises: in an inductor switching mode, controlling the plurality of switches via an inductor operation signal, whereby one end of the at least one inductor to be alternatingly coupled to the first voltage or the DC voltage level, to thereby convert the first voltage to the second voltage and maintain the second voltage within the first predetermined range or to thereby convert the second voltage to the first voltage and maintain the first voltage within the second predetermined range.

In one embodiment, the switched capacitor voltage conversion method further comprises:
in the resonant operation mode and/or in the inductor switching mode, reducing a duty ratio of one or more of (1) to (3): (1) the charging operation signal; (2) the discharging operation signal; and/or (3) the inductor operation signal, so that when a part of the plurality of switches are ON, an inductor current flowing toward the second voltage is in a first state and so that when the plurality of switches are OFF, the inductor current flowing through the inductor continues flowing along at least one continuing current flow path and the inductor current flowing toward the second voltage is in a second state, whereby the inductor performs inductive power conversion to switch between the first state and the second state.

In one embodiment, the switched capacitor voltage conversion method further comprises: in the resonant operation mode and/or in the inductor switching mode, when a duty ratio of one or more of (1) to (3) is reduced: (1) the charging operation signal; (2) the discharging operation signal; and/or (3) the inductor operation signal, and when all of the plurality of switches are OFF, the one end of the inductor is conducted to the DC level through a body diode of at least one switch, whereby the inductor current flowing toward the second voltage is the linear ramp current.

In one embodiment, the at least one capacitor includes two capacitors, and the resonant operation mode includes a 2-to-1 mode and/or a 3-to-1 mode; the switched capacitor voltage conversion method further comprises: deciding whether the switched capacitor converter to operate in the 2-to-1 mode or the 3-to-1 mode according to the first voltage; wherein in the 2-to-1 mode, the plurality of switches are controlled so that in the charging process, one of the capacitors and one corresponding inductor form the charging path and operate in resonant operation and so that in the discharging process, the one capacitor and the one corresponding inductor form the discharging path and operate in resonant operation; wherein in the 3-to-1 mode, the plurality of switches are controlled so that in the charging process, the two capacitors and one corresponding inductor form the charging path and operate in resonant operation and so that in the discharging process, the two capacitors and the one corresponding inductor form the discharging path and operate in resonant operation; wherein in the 2-to-1 mode, the first voltage is 2-fold of the second voltage, and wherein in the 3-to-1 mode, the first voltage is 3-fold of the second voltage.

In one embodiment, the step of deciding whether the switched capacitor converter operates in the resonant operation mode or in the inductor switching mode includes: deciding to control the switched capacitor converter to operate in one of (1) to (3) according to the first voltage: (1) the 2-to-1 mode; (2) the 3-to-1 mode; or (3) the inductor switching mode, so as to maintain the second voltage within the first predetermined range.

In one embodiment, the inductor switching mode includes: a 2-level inductor switching mode and/or a 3-level inductor switching mode, and the inductor operation signal correspondingly includes: a 2-level inductor operation signal and/or a 3-level inductor operation signal; wherein in the 2-level inductor switching mode, the 2-level inductor operation signal controls the plurality of switches, so that a voltage at the one end of the at least one inductor is periodically switched between the first voltage and the DC voltage level, so as to convert the first voltage to the second voltage or convert the second voltage to the first voltage; wherein in the 3-level inductor switching mode, the 3-level inductor operation signal controls the plurality of switches, so that the voltage at the one end of the at least one inductor is periodically switched among the first voltage, ½-fold of the first voltage and the DC voltage level, so as to convert the first voltage to the second voltage or convert the second voltage to the first voltage.

In one embodiment, the step of deciding whether the switched capacitor converter operates in the resonant operation mode or in the inductor switching mode includes: deciding to control the switched capacitor converter to operate in one of (1) to (4) according to the first voltage: (1) the 2-to-1 mode; (2) the 3-to-1 mode; (3) the 2-level inductor switching mode; or (4) the 3-level inductor switching mode, so as to maintain the second voltage within the first predetermined range.

In one embodiment, the switched capacitor voltage conversion method further comprises: sensing a current flowing through the at least one inductor, to generate at least one current sensing signal; and generating the charging operation signal, the least one discharging operation signal and the inductor operation signal according to the at least one current sensing signal.

In one embodiment, the switched capacitor voltage conversion method further comprises: sensing the second voltage or the first voltage, to generate a voltage sensing signal; and in the inductor switching mode, generating the inductor operation signal further according to the voltage sensing signal.

In one embodiment, the at least one capacitor includes N capacitors, and the resonant operation mode includes a M-to-1 mode, wherein N is a natural number greater than three, and wherein M is a natural number greater than two and smaller than and equal to N+1; the switched capacitor voltage conversion method further comprises: determining a value of M according to the first voltage and deciding to control the switched capacitor converter to operate in the M-to-1 mode; and in the M-to-1 mode, controlling the plurality of switches, so that in the charging process, the M−1 capacitors and one corresponding inductor form the charging path and operate in resonant operation and so that in the discharging process, the M−1 capacitors and the one corresponding inductor form the discharging path and operate in resonant operation.

Advantages of the present invention include: that by providing a flexible switching among M-to-1 mode, 2-level inductor switching mode and/or 3-level inductor switching mode, the variation of the output voltage is in a much smaller range; that various different operation modes can provide different voltage conversion ratios; and that the resonant switched capacitor voltage converter if the present invention can automatically switch among various different operation modes.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
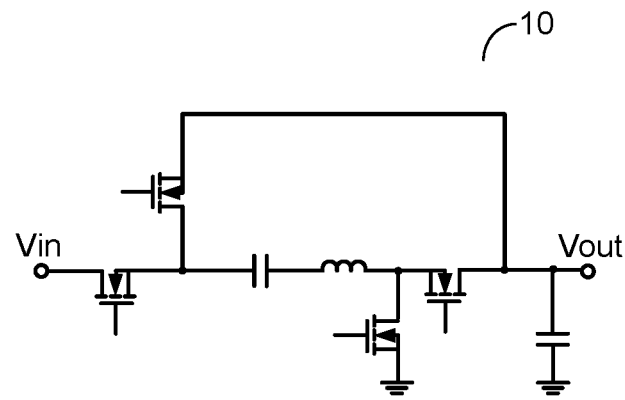
FIG. 1 shows a schematic diagram of a conventional resonant switched capacitor voltage converter.
Figure 2A:
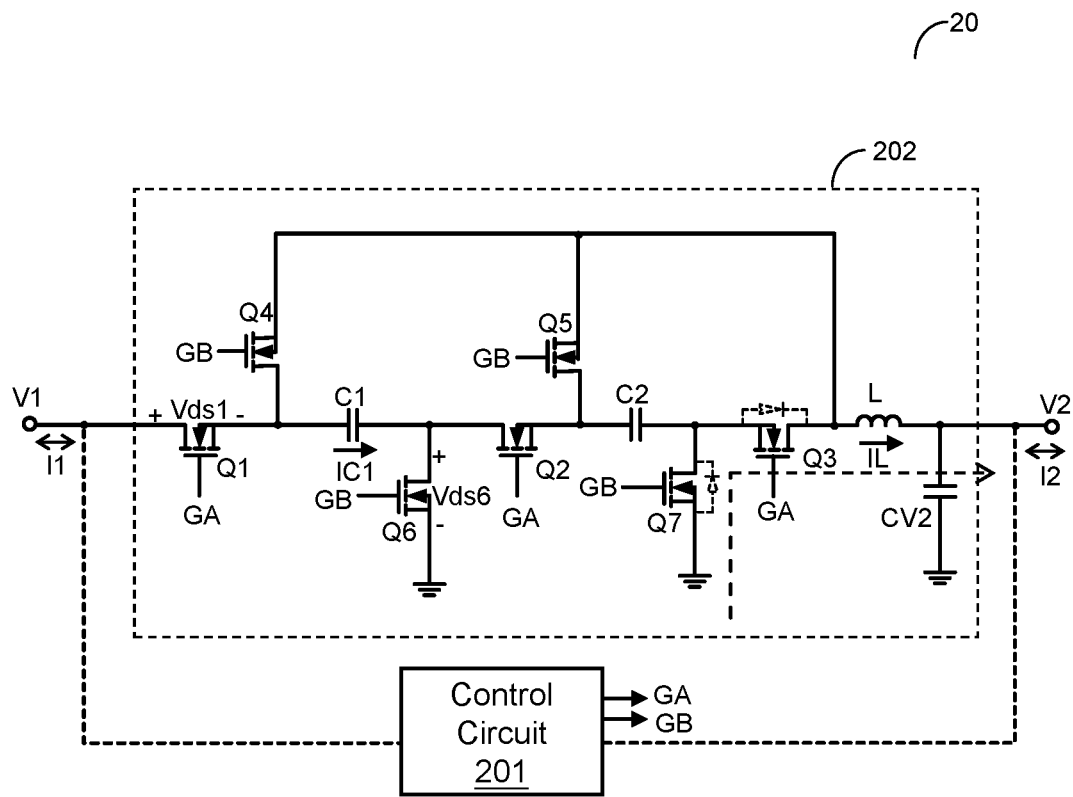
FIG. 2A shows a schematic circuit diagram of a switched capacitor voltage converter circuit according to an embodiment of the present invention.

Please refer to FIG. 2A, which shows a schematic circuit diagram of a switched capacitor voltage converter circuit according to an embodiment of the present invention. As shown in FIG. 2A, the switched capacitor voltage converter circuit 20 is configured to operably convert a first voltage V1 to a second voltage V2 or convert the second voltage V2 to the first voltage V1. The switched capacitor voltage converter circuit 20 includes: a control circuit 201 and a switched capacitor converter 202. The switched capacitor converter 202 is coupled between the first voltage V1 and the second voltage V2. The control circuit 201 is configured to operably generate a control signal for controlling the switched capacitor converter 202, so as to convert the first voltage V1 to the second voltage V2 or convert the second voltage V2 to the first voltage V1. In this embodiment, the control signal includes a charging operation signal GA and at least one discharging operation signal GB. The switched capacitor converter 202 includes at least one capacitor (in this embodiment, capacitors C1 and C2), switches Q1~Q7 and at least one inductor L. The switches Q1~Q7 are coupled to the capacitors C1 and C2.

The control circuit 201 is configured to operably select a ratio of the first voltage V1 to the second voltage V2 according to a level of the first voltage V1, so that the second voltage V2 is maintained within a first predetermined range, and to generate the control signal accordingly, so as to convert the first voltage V1 to the second voltage V2 in the first predetermined range. Or, the control circuit 201 is configured to operably select a ratio of the first voltage V1 to the second voltage V2 according to a level of the second voltage V2, so that the first voltage V1 is maintained at a second predetermined range, and to generate the control signal accordingly, so as to convert the second voltage V2 to the first voltage V1 in the second predetermined range.

In a charging process of a resonant operation mode, the charging operation signal GA controls the switches Q1~Q7, so that a series connection of the capacitors C1 and C2 and the inductor L is formed between the first voltage V1 and the second voltage V2, to form a charging path and operate in resonant operation. In at least one discharging process of the resonant operation mode, the at least one discharging operation signal GB controls the switches Q1~Q7, so that a series connection of each capacitor C1/C2 and the inductor L is formed between the second voltage V2 and a DC voltage level (in this embodiment, the DC voltage level is a ground level), to simultaneously or sequentially form plural discharging paths and operate in resonant operation. In the resonant operation mode, the charging process and the at least one discharging processes are arranged in a repeated, alternating order, so as to convert the first voltage V1 to the second voltage V2 or convert the second voltage V2 to the first voltage V1.

Please still refer to FIG. 2A. In the resonant operation mode, the control circuit 201 can reduce a duty ratio of the charging operation signal GA and/or a duty ratio of the discharging operation signal GB, so that when a part of the switches (e.g., switches Q1~Q3 or switches Q4~Q7) are ON, an inductor current IL flowing toward the second voltage V2 is in a first state, and so that when all of the switches (e.g., switches Q1~Q7) are OFF, the inductor current IL continues flowing along at least one continuing current flow path (for example, through the conduction of the body diode of at least one switch), whereby the inductor current IL flowing toward the second voltage V2 to be in a second state, whereby the inductor L performs inductive power conversion to switch between the first state and the second state (i.e., inductor switching mode).

In one embodiment, in the resonant operation mode, the first state is that the inductor current IL flowing toward the second voltage V2 is a resonant current. In one embodiment, the second state is that the inductor current IL flowing toward the second voltage V2 is a non-resonant current. In a preferred embodiment, the second state is that the inductor current IL flowing toward the second voltage V2 is a linear ramp current. For example, in the resonant operation mode and/or in the inductor switching mode (to be explained in detail later), the control circuit 201 reduces a duty ratio of the charging operation signal GA and/or a duty ratio of the discharging operation signal GB, so that when all of the switches (e.g., switches Q1~Q7) are OFF, one end of the inductor L is conducted to a DC voltage level via a body diode of at least one switch (e.g., switches Q3 and Q7), such that the inductor current IL flowing toward the second voltage V2 is a linear ramp current.

Please still refer to FIG. 2A. The switched capacitor converter 202 can further operate in an inductor switching mode. In the inductor switching mode, the control signal further includes an inductor operation signal, which is configured to operably control the switches (e.g., switches Q1~Q7), so that one end (as shown by the left end of the inductor L in FIG. 2A) of the inductor L is alternatingly coupled to (i.e., periodically switched between) the first voltage V1 or the DC voltage level (in this embodiment, the DC voltage level is a ground level), and to thereby convert the first voltage V1 to the second voltage V2 and maintain the second voltage V2 within the first predetermined range or to thereby convert the second voltage V2 to the first voltage V1 and maintain the first voltage within the second predetermined range.

Figure 2B:
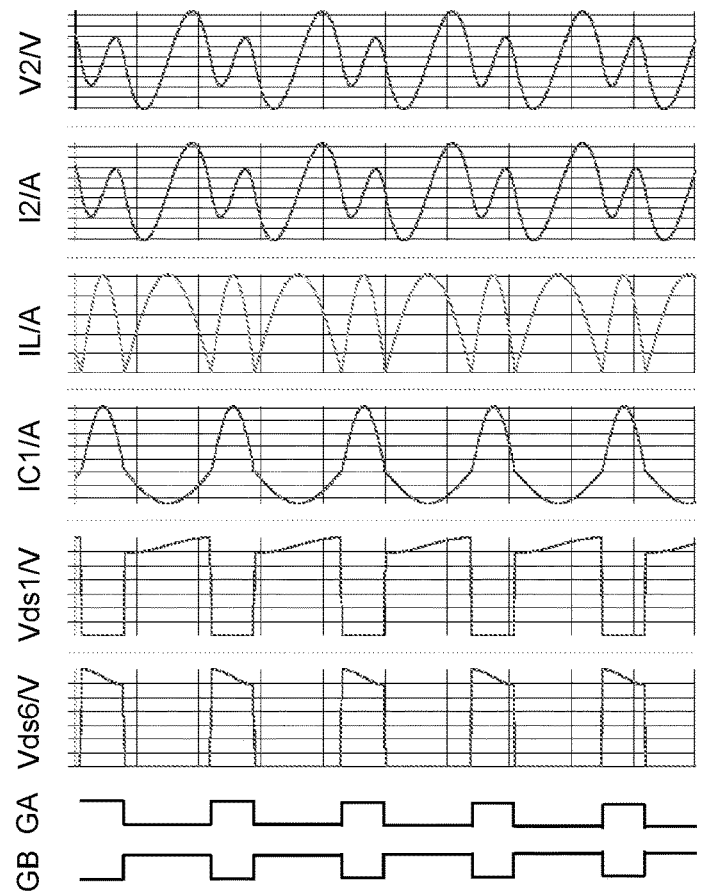
FIG. 2B illustrates waveform diagrams of relevant signals during the operation of the switched capacitor voltage converter circuit of FIG. 2A.

Please refer to FIG. 2B, which illustrates waveform diagrams of relevant signals during the operation of the switched capacitor voltage converter circuit of FIG. 2A. The second voltage V2, a second current, the inductor current IL, a capacitor current IC1, a drain-source voltage Vds1 of the switch Q1, a drain-source voltage Vds1 of the switch Q6, the charging operation signal GA and the discharging operation signal GB are shown in FIG. 2B. As shown in FIG. 2B, in the resonant operation mode, the charging operation signal GA and the at least one discharging operation signal GB have respective ON periods which do not overlap one another, so that the charging process and the at least one discharging process do not overlap each other.

Figure 2C:
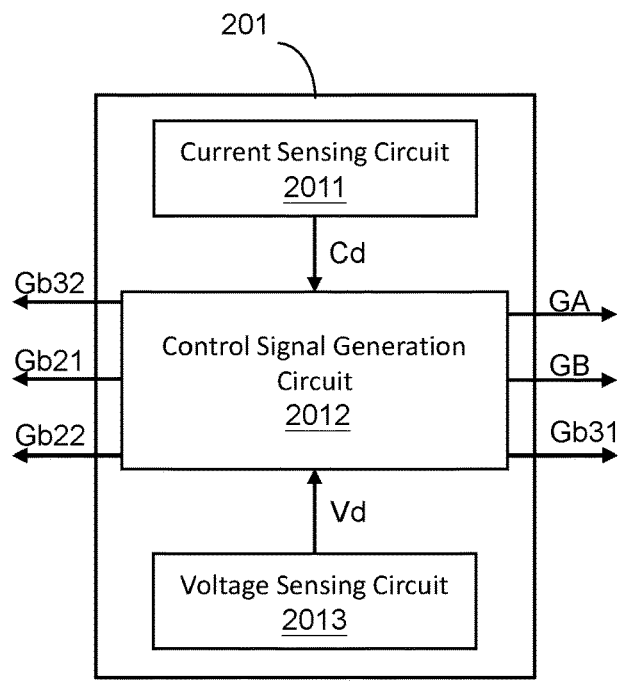
FIG. 2C shows a schematic block diagram of a control circuit in a switched capacitor voltage converter circuit according to an embodiment of the present invention.

Please refer to FIG. 2C, which shows a schematic block diagram of a control circuit in a switched capacitor voltage converter circuit according to an embodiment of the present invention. Please refer to FIG. 2C in conjugation with FIG. 2A. The control circuit 201 includes: a current sensing circuit 2011, a control signal generation circuit 2012 and a voltage sensing circuit 2013. The current sensing circuit 2011 is configured to operably sense a current flowing through the at least one inductor L, to generate at least one corresponding current sensing signal Cd. The control signal generation circuit 2012 is coupled to the current sensing circuit 2011. The control signal generation circuit 2012 is configured to operably generate the control signal (such as the charging operation signal GA and the discharging operation signal GB). The voltage sensing circuit is configured to operably sense the second voltage V2, to generate a voltage sensing signal Vd. In the inductor switching mode, the control signal generation circuit 2012 is configured to operably generate an inductor operation signal according to the current sensing signal Cd, wherein the inductor operation signal for example includes: 2-level inductor operation signals Gb21 and Gb22 (to be explained in detail later) and/or 3-level inductor operation signals Gb31 and Gb32 (to be explained in detail later).

Figure 3A:
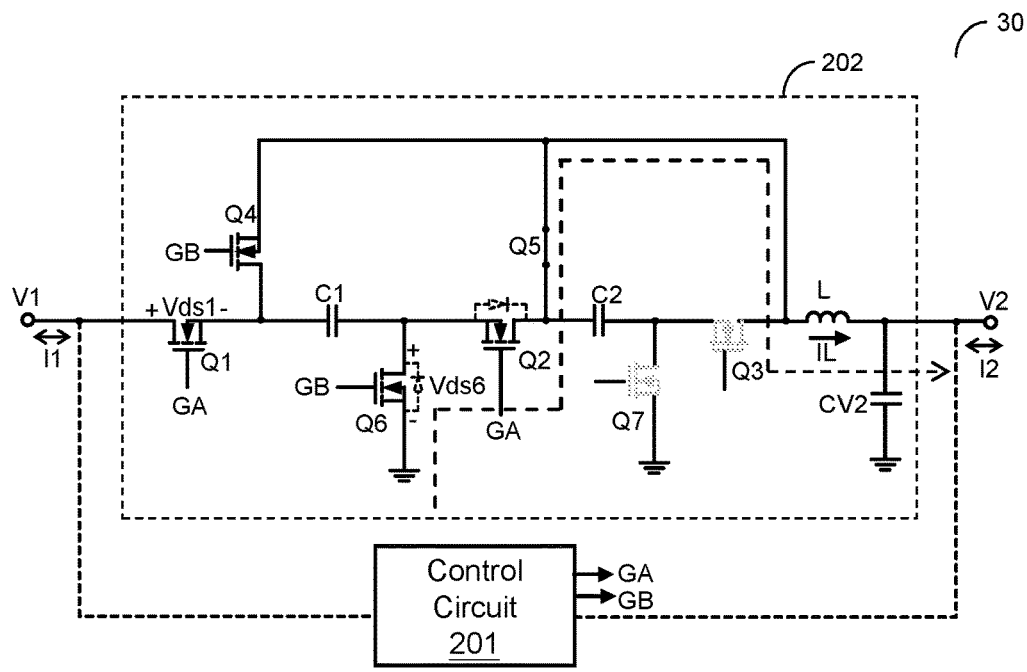
FIG. 3A shows a schematic circuit diagram of a switched capacitor voltage converter circuit according to another embodiment of the present invention.

Please refer to FIG. 3A, which shows a schematic circuit diagram of a switched capacitor voltage converter circuit according to another embodiment of the present invention. This embodiment shown in FIG. 3A is similar to the embodiment shown in FIG. 2A, but is different in that: in this embodiment, the switch Q5 is always ON, whereas, the switch Q3 and the switch Q7 are always OFF, so that the switched capacitor voltage converter 202 operates in a 2-to-1 mode, that is, in the 2-to-1 mode, the ratio of the first voltage V1 to the second voltage V2 is 2:1. In a charging process of a resonant operation mode, the charging operation signal GA is configured to operably control the switches Q1, Q2, Q4 and Q6, so that a series connection of the at least one capacitor C1 and the inductor L is formed between the first voltage V1 and the second voltage V2, to form a charging path and operate in resonant operation. In at least one discharging process of the resonant operation mode, the at least one discharging operation signal is configured to operably control the switches Q1, Q2, Q4 and Q6, so that a series connection of the at least one capacitor C1 and the inductor L is formed between the second voltage V2 and a DC voltage level, to form a discharging path and operate in resonant operation. The inductor current IL continues flowing through the inductor L in a way similar to the embodiment shown in FIG. 2, but is different in that: in this embodiment, the inductor current IL continues flowing through the inductor L through the conduction of the body diodes of the switches Q2 and Q6. In one embodiment, the control circuit decides whether the switched capacitor converter operates in a 2-to-1 mode or a 3-to-1 mode according to the first voltage V1, so as to maintain the second voltage V2 within the first predetermined range.

Figure 3B:
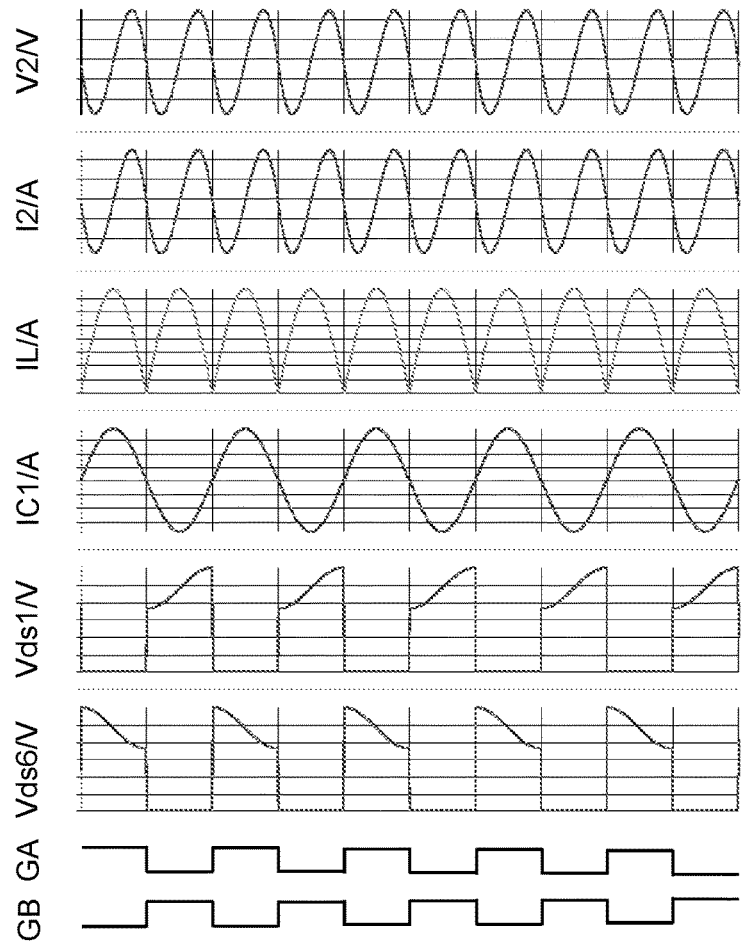
FIG. 3B illustrates waveform diagrams of relevant signals during the operation of the switched capacitor voltage converter circuit of FIG. 3A.

Please refer to FIG. 3B, which illustrates waveform diagrams of relevant signals involving the operation of FIG. 3A. The second voltage V2, a second current, the inductor current IL, a capacitor current IC1, a drain-source voltage Vds1 of the switch Q1, a drain-source voltage Vds1 of the switch Q6, the charging operation signal GA and the discharging operation signal GB are shown in FIG. 3B.

Figure 3C:
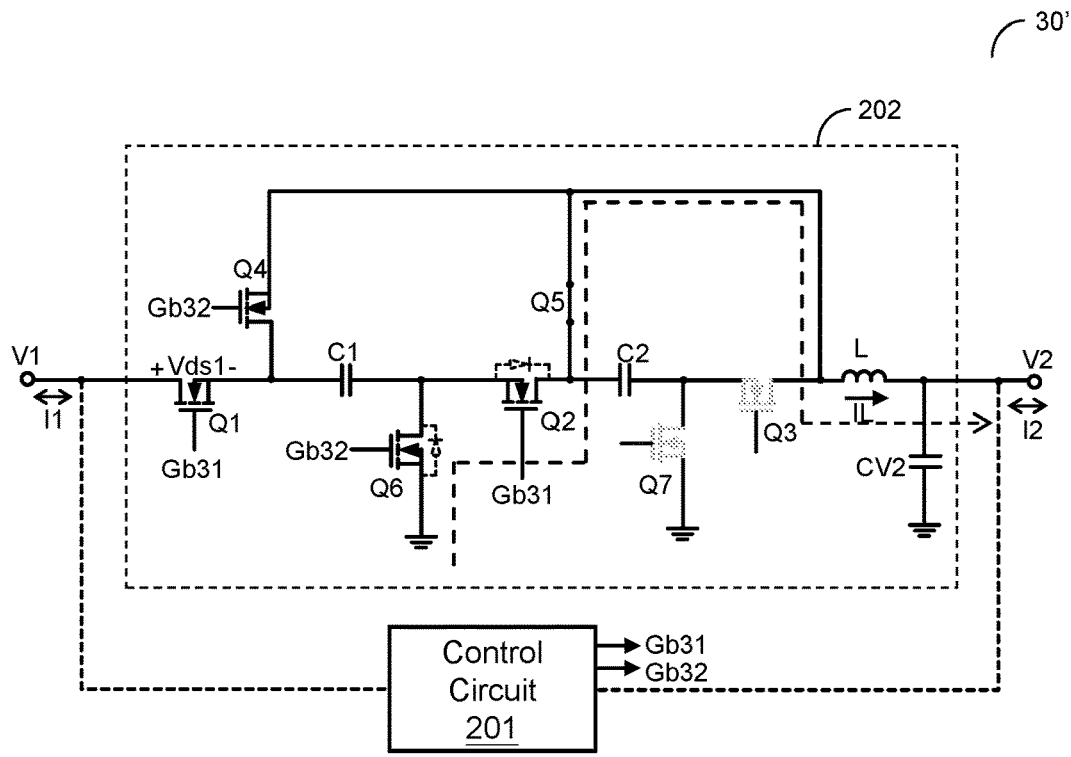
FIG. 3C shows a schematic circuit diagram of a switched capacitor voltage converter circuit according to yet another embodiment of the present invention.
Figure 3D:
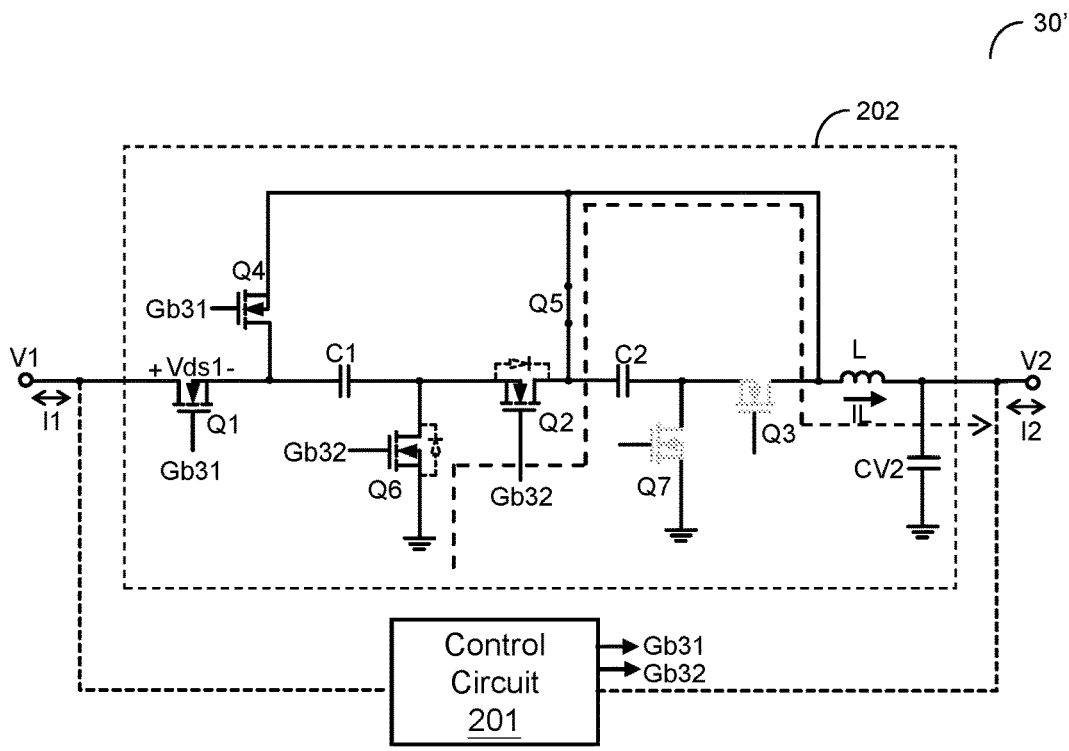
FIG. 3D shows a schematic circuit diagram of a switched capacitor voltage converter circuit according to still another embodiment of the present invention.

Please refer to FIG. 3C, which shows a schematic circuit diagram of a switched capacitor voltage converter circuit according to yet another embodiment of the present invention. Please refer to FIG. 3D, which shows a schematic circuit diagram of a switched capacitor voltage converter circuit according to still another embodiment of the present invention. The embodiment shown in FIG. 3C and the embodiment shown in FIG. 3D are similar to the embodiment shown in FIG. 3A, but is different in that: in the embodiment shown in FIG. 3C and the embodiment shown in FIG. 3D, the control signal further includes an inductor operation signal, wherein the inductor operation signal includes: 3-level inductor operation signals Gb31 and Gb32. In a 3-level inductor switching mode, the 3-level inductor operation signals Gb31 and Gb32 control the switches (e.g., the switches Q1, Q2, Q4 and Q6) and in the 3-level inductor switching mode, the switch Q3 and the switch Q7 are always OFF, so that the voltage at the one end of the at least one inductor L is periodically switched among the first voltage V1, ½-fold of the first voltage V1 and the DC voltage level (in this embodiment, the DC voltage level is a ground level), so as to convert the first voltage V1 to the second voltage V2.

Please still refer to FIG. 3C. In the inductor switching mode, the control circuit 201 can reduce the duty ratio of each of the 3-level inductor operation signals Gb31 and Gb32, so that when a part of the switches (e.g., the switches Q1 and Q2, or, the switches Q4 and Q6) are ON, an inductor current IL flowing toward the second voltage V2 is in a first state, and so that when all of the switches (e.g., switches Q1, Q2, Q4 and Q6) are OFF, the inductor current IL continues flowing along at least one continuing current flow path (for example through the body diode of at least one switch such as the switches Q2 and Q6), wherein the inductor current IL flowing toward the second voltage V2 is in a second state, such that the inductor L performs inductive power conversion to switch between the first state and the second state. In one embodiment, the first state is that the inductor current IL flowing toward the second voltage V2 is a non-resonant current. In a preferred embodiment, the first state is that inductor current IL flowing toward the second voltage V2 is a triangle wave current. In one embodiment, the second state is that inductor current IL flowing toward the second voltage V2 is a non-resonant current. In a preferred embodiment, the second state is that inductor current IL flowing toward the second voltage V2 is a linear ramp current.

Referring to FIG. 3C, when the second voltage lies between the first voltage V1 and ½-fold of the first voltage V1, the 3-level inductor operation signal Gb32 is configured to operably control the switches Q1, Q2, Q4 and Q6, so that a series connection of the at least one capacitor C1 and the inductor L is formed between the second voltage V2 and a DC voltage level. Besides, as shown in FIG. 3D, the 3-level inductor operation signal Gb31 is configured to operably control the switches Q1, Q2, Q4 and Q6, so that one end of the inductor L is coupled to the first voltage V1, whereby the voltage at the one end of the inductor L is periodically switched among the first voltage V1 and ½-fold of the first voltage V1. In another embodiment, when the second voltage lies between zero voltage and ½-fold of the first voltage V1, as shown in FIG. 3C, the 3-level inductor operation signal Gb31 is configured to operably control the switches Q1, Q2, Q4 and Q6, so that a series connection of the at least one capacitor C1 and the inductor L is formed between the first voltage V1 and the second voltage V2. Besides, as shown in FIG. 3D, the 3-level inductor operation signal Gb32 is configured to operably control the switches Q1, Q2, Q4 and Q6, so that one end of the inductor L is coupled to the DC voltage level (in this embodiment, the DC voltage level is a ground level), so that the voltage at the one end of the inductor L is periodically switched among the zero voltage and ½-fold of the first voltage V1. The inductor current IL continues flowing in a way which is similar to the embodiment shown in FIG. 3C; please refer to the relevant description mentioned in the embodiment of FIG. 3C.

Figure 4:
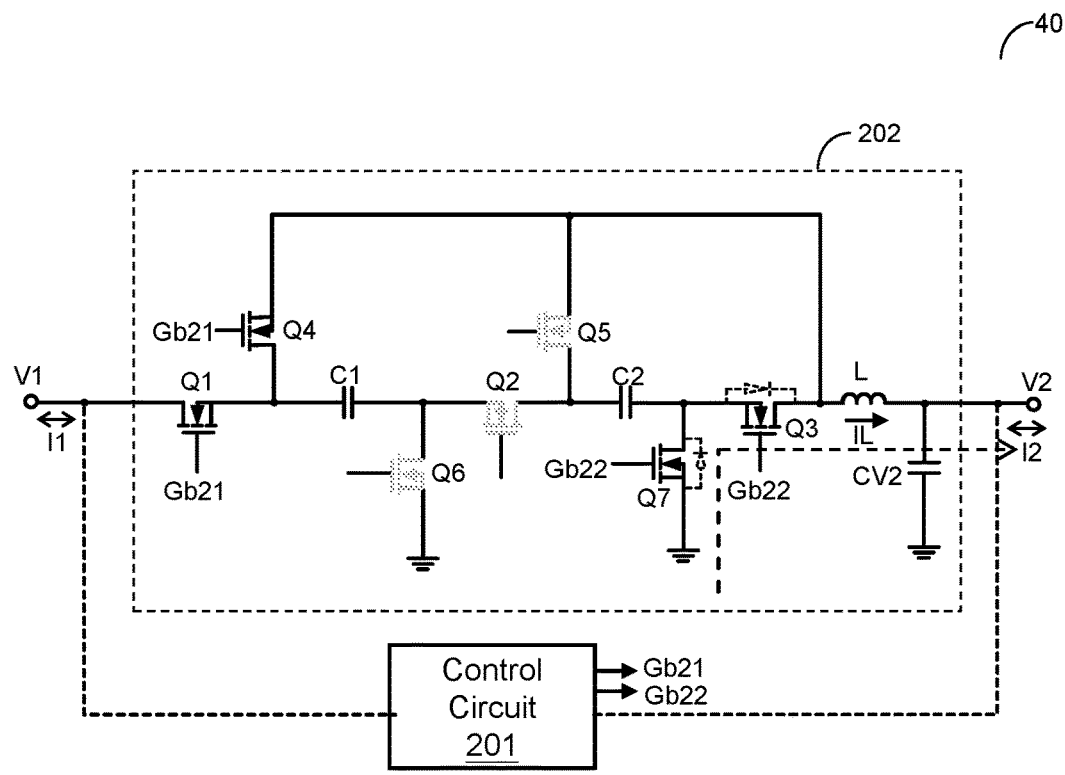
FIG. 4 shows a schematic circuit diagram of a switched capacitor voltage converter circuit according to still another embodiment of the present invention.

Please refer to FIG. 4, which shows a schematic circuit diagram of a switched capacitor voltage converter circuit according to still another embodiment of the present invention. This embodiment shown in FIG. 4 is similar to the embodiment shown in FIG. 2A, but is different in that: in this embodiment, the switches Q2, Q5 and Q6 are always OFF. The control signal further includes: 2-level inductor operation signals Gb21 and Gb22. In a 2-level inductor switching mode, the 2-level inductor operation signals Gb21 and Gb22 control the switches Q1, Q3, Q4 and Q7, so that one end of the at least one inductor L is alternatingly coupled to (i.e., periodically switched between) the first voltage V1 or the DC voltage level, so as to convert the first voltage V1 to the second voltage V2. In one embodiment, the control circuit 201 decides to control the switched capacitor converter 202 to operate in one of (1) to (4) according to the first voltage V1: (1) the 2-to-1 mode; (2) the 3-to-1 mode; (3) the 2-level inductor switching mode; or (4) the 3-level inductor switching mode, so as to maintain the second voltage V2 within the first predetermined range. In another embodiment, the control circuit 201 decides to control the switched capacitor converter 202 to operate in one of (1) to (3) according to the first voltage V1: (1) the 2-to-1 mode; (2) the 3-to-1 mode; or (3) the inductor switching mode, so as to maintain the second voltage V2 within the first predetermined range. The inductor current IL continues flowing in a way which is similar to the embodiment shown in FIG. 3C; please refer to the relevant description mentioned in the embodiment shown in FIG. 3C. However, this embodiment is different from the embodiment shown in FIG. 3C in that: in this embodiment, the inductor current IL continues flowing through the body diodes of the switches Q3 and Q7.

Figure 5:
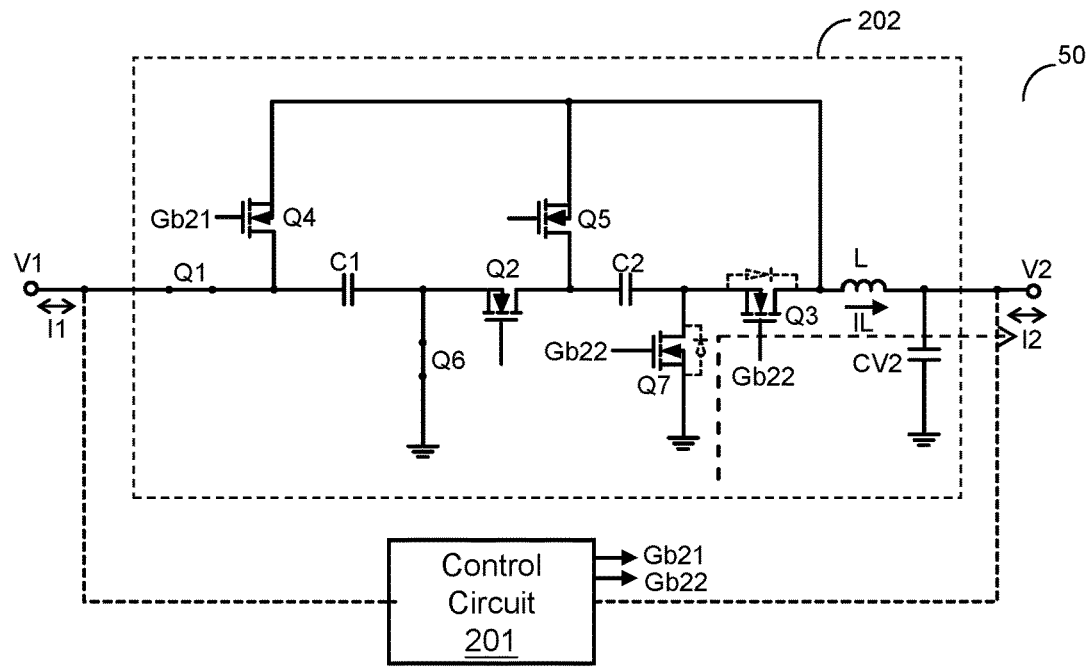
FIG. 5 shows a schematic circuit diagram of a switched capacitor voltage converter circuit according to still another embodiment of the present invention.

Please refer to FIG. 5, which shows a schematic circuit diagram of a switched capacitor voltage converter circuit according to still another embodiment of the present invention. This embodiment shown in FIG. 5 is similar to the embodiment shown in FIG. 4 (please refer to the above-mentioned description regarding the embodiment of FIG. 4), but is different in that: in this embodiment, the switches Q1 and Q6 are always ON. The 2-level inductor operation signals Gb21 and Gb22 only control the switches Q3, Q4 and Q7, so that one end of the at least one inductor L is alternatingly coupled to (i.e., periodically switched between) the first voltage V1 or the DC voltage level and so that the capacitor C1 can function as an input capacitor. The inductor current IL continues flowing in a way which is similar to the embodiment shown in FIG. 4, so please refer to the relevant description mentioned in the embodiment of FIG. 4.

Figure 6:
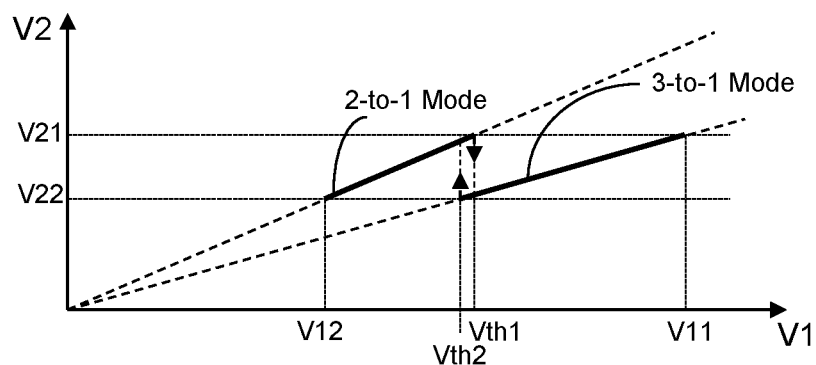
FIG. 6 shows a characteristic diagram depicting operation modes of a switched capacitor voltage converter circuit according to an embodiment of the present invention.

Please refer to FIG. 6, which shows a characteristic diagram depicting operation modes of a switched capacitor voltage converter circuit according to an embodiment of the present invention. Please refer to FIG. 6 in conjugation with FIG. 2A and FIG. 3A. With the target to maintain the second voltage V2 within a first predetermined range (e.g., a voltage range between a voltage V21 and a voltage V22), the control circuit 201 decides whether the switched capacitor converter 202 operates in a 2-to-1 mode or a 3-to-1 mode according to a level of the first voltage V1, so that the second voltage V2 is maintained within the first predetermined range, such as the aforementioned range between the voltage V21 and the voltage V22. As shown in FIG. 6, the control circuit 201 switches the operation modes in a hysteresis fashion. To be more specific, when the first voltage V1 is greater than a first threshold Vth1, the control circuit 201 controls the switched capacitor converter 202 to operate in the 3-to-1 mode. When the first voltage V1 is smaller than a second threshold Vth2, the control circuit 201 controls the switched capacitor converter 202 to operate in the 2-to-1 mode.

Figure 7:
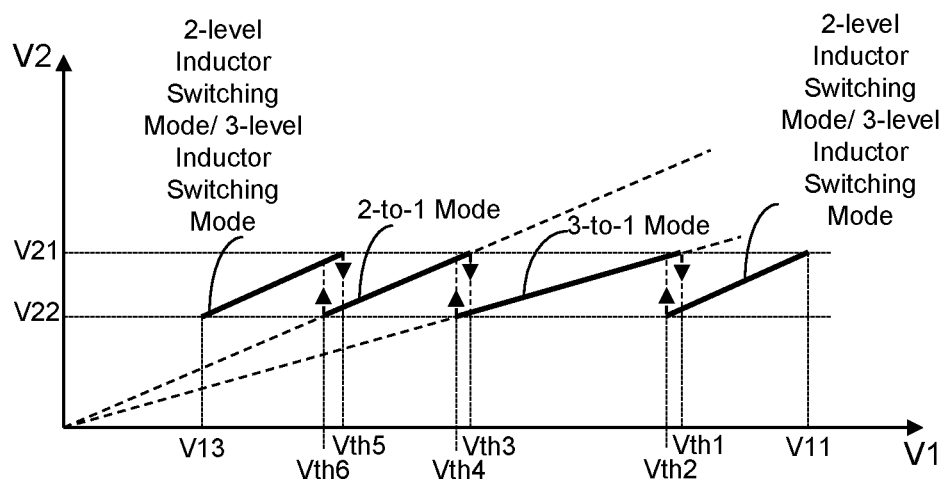
FIG. 7 shows a characteristic diagram depicting operation modes of a switched capacitor voltage converter circuit according to another embodiment of the present invention.

Please refer to FIG. 7, which shows a characteristic diagram depicting operation modes of a switched capacitor voltage converter circuit according to another embodiment of the present invention. Please refer to FIG. 7 in conjugation with FIG. 2A, FIG. 3A, FIG. 3C, FIG. 3D, FIG. 4 and FIG. 5, the control circuit 201 decides to control the switched capacitor converter 202 to operate in one of (1) to (4) according to the first voltage V1: (1) the 2-to-1 mode; (2) the 3-to-1 mode; (3) the 2-level inductor switching mode; or (4) the 3-level inductor switching mode, so as to maintain the second voltage V2 within the first predetermined range. As shown in FIG. 7, when the first voltage V1 is greater than a first threshold Vth1, the control circuit 201 controls the switched capacitor converter 202 to operate in the 2-level inductor switching mode or in the 3-level inductor switching mode. When the first voltage V1 is smaller than a second threshold Vth2 and greater than a third threshold Vth3, the control circuit 201 controls the switched capacitor converter 202 to operate in the 3-to-1 mode. When the first voltage V1 is smaller than a fourth threshold Vth4 and greater than a fifth threshold Vth5, the control circuit 201 controls the switched capacitor converter 202 to operate in the 2-to-1 mode. When the first voltage V1 is smaller than a sixth threshold Vth6, the control circuit 201 controls the switched capacitor converter 202 to operate in the 2-level inductor switching mode or in the 3-level inductor switching mode.

Figure 8:
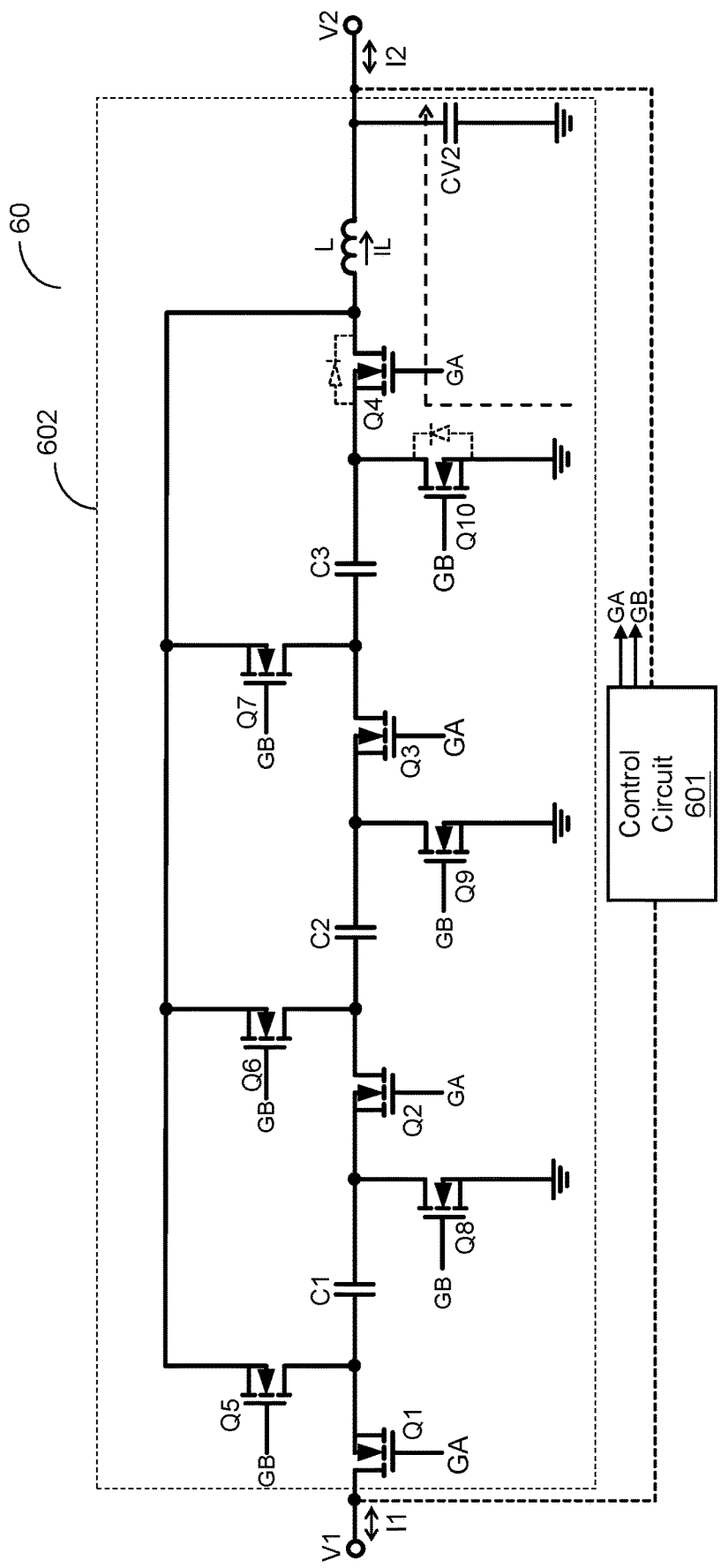
FIG. 8 shows a schematic circuit diagram of a switched capacitor voltage converter circuit according to still another embodiment of the present invention.

Please refer to FIG. 8, which shows a schematic circuit diagram of a switched capacitor voltage converter circuit according to still another embodiment of the present invention. As shown in FIG. 8, the switched capacitor converter 602 includes: capacitors C1~C3, switches Q1~Q10 and an inductor L. The switches Q1~Q3 are connected in series to the capacitors C1~C3, correspondingly. The switch Q4 is connected in series to the inductor L.

The switches Q1-Q10 can switch electrical connection relationships between the corresponding capacitors C1-C3 and the inductor L according to the corresponding operation signals. In a charging process, according to the charging operation signal GA, the switches Q1-Q4 are turned ON, whereas, the switches Q5-Q10 are turned OFF, so that a series connection of the capacitors C1-C3 and the inductor L is formed between the first voltage V1 and the second voltage V2, to form a charging path. In a discharging process, according to discharging operation signal GB, the switches Q5-Q10 are turned ON, whereas, the switches Q1-Q4 are turned OFF, so that the capacitors C1-C3 are connected in parallel and the parallel connection is connected in series to the inductor, to form plural discharging paths between the second voltage V2 and the ground level. It is noteworthy that, in one embodiment, the above-mentioned charging process and the above-mentioned discharging process are arranged at different periods in a repeated, alternating order, so as to convert the first voltage V1 to the second voltage V2 or convert the second voltage V2 to the first voltage V1. That is, the above-mentioned charging process and the above-mentioned discharging process are not performed at the same time. As a consequence, the capacitors C1, C2 and C3 of this embodiment, as compared to the prior art, will only need to withstand a relatively lower rated voltage. Hence, this embodiment can utilize capacitors having a relatively smaller size.

The control circuit 601 and its operation mechanism of this embodiment can be implemented in a way similar to those described in the embodiments of FIG. 2A, FIG. 3A, FIG. 3C, FIG. 3D, FIG. 4 and FIG. 5; please refer to the descriptions regarding these embodiments for details. If the inductor current IL continues flowing in a 4-to-1 mode, it is similar to the embodiment shown in FIG. 2A. If the inductor current IL continues flowing in a 3-to-1 mode or in a 2-to-1 mode, it is similar to the embodiment shown in FIG. 3A. If the inductor current IL continues flowing in a 3-level inductor switching mode, it is similar to the embodiment shown in FIG. 3C and the embodiment shown in FIG. 3D. If the inductor current IL continues flowing of this embodiment operates in a 2-level inductor switching mode, it is similar to the embodiment shown in FIG. 4 and the embodiment shown in FIG. 5. Please refer to the descriptions regarding the corresponding embodiments for details.

Figure 9:
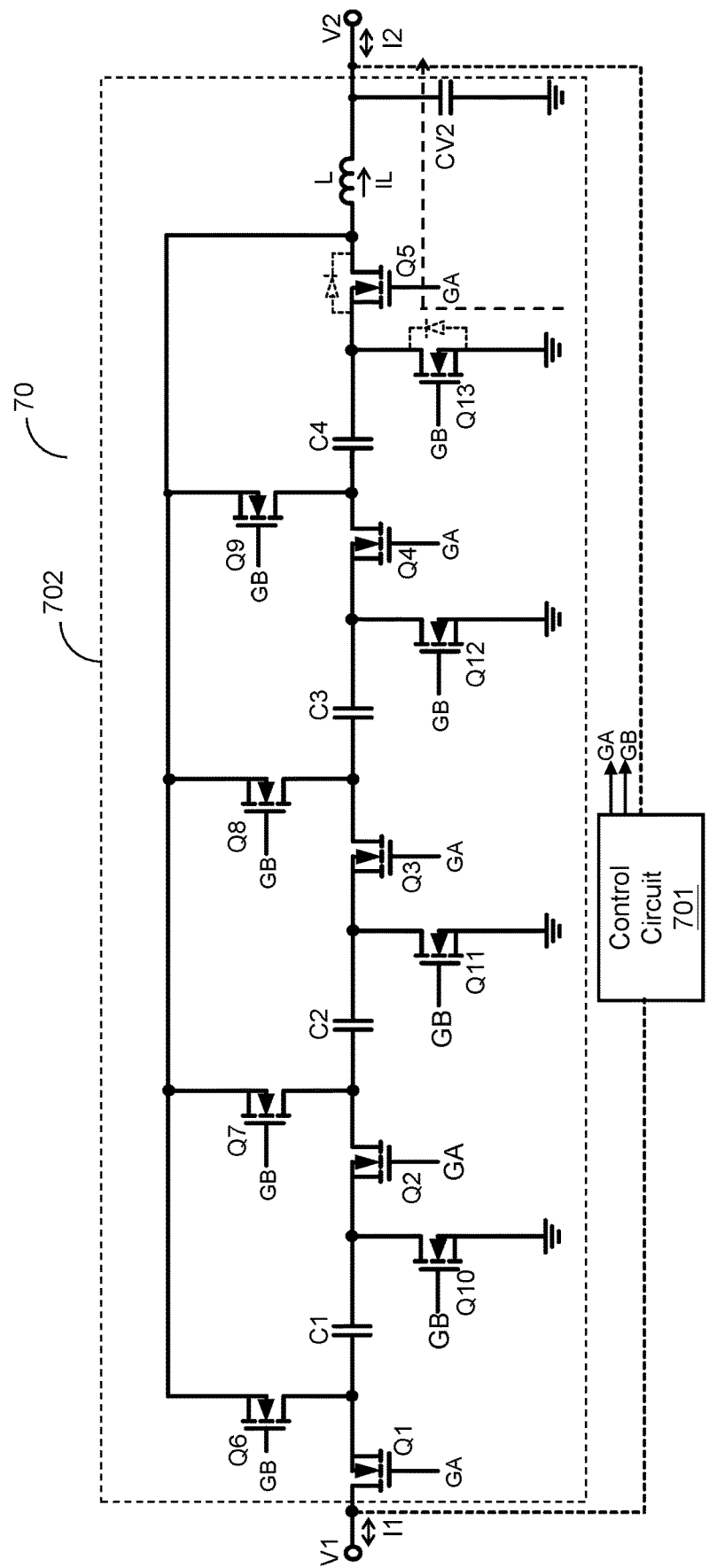
FIG. 9 shows a schematic circuit diagram of a switched capacitor voltage converter circuit according to still another embodiment of the present invention.

Please refer to FIG. 9, which shows a schematic circuit diagram of a switched capacitor voltage converter circuit according to still another embodiment of the present invention. As shown in FIG. 9, the switched capacitor converter 702 includes: capacitors C1~C4, switches Q1~Q13 and an inductor L. The switches Q1~Q4 are connected in series to the capacitors C1~C4, correspondingly. The switch Q5 is connected in series to the inductor L.

The switches Q1-Q13 can switch electrical connection relationships among the capacitors C1-C4 and the inductor L according to the corresponding operation signals. In a charging process, according to the charging operation signal GA, the switches Q1-Q5 are turned ON, whereas, the switches Q6-Q13 are turned OFF, so that a series connection of the capacitors C1-C4 and the inductor L is formed between the first voltage V1 and the second voltage V2, to form a charging path. In a discharging process, according to discharging operation signal GB, the switches Q6-Q13 are turned ON, whereas, the switches Q1-Q5 are turned OFF, so that the capacitors C1-C4 are connected in parallel and the parallel connection is connected in series to the inductor L to form plural discharging paths between the second voltage V2 and the ground level. It is noteworthy that, in one embodiment, the above-mentioned charging process and the above-mentioned discharging process are arranged at different periods in a repeated, alternating order, so as to convert the first voltage V1 to the second voltage V2 or convert the second voltage V2 to the first voltage V1. That is, the above-mentioned charging process and the above-mentioned discharging process are not performed at the same time. In this embodiment, the DC bias voltages of the capacitors C1, C2 and C3 are all equal to the second voltage V2. As a consequence, the capacitors C1, C2, C3 and C4 of this embodiment, as compared to the prior art, will only need to withstand a relatively lower rated voltage. Hence, this embodiment can utilize capacitors having a relatively smaller size.

The control circuit 701 and its operation mechanism of this embodiment can be implemented in a way similar to the control circuit and operation mechanism of the embodiments in FIG. 2A, FIG. 3A, FIG. 3C, FIG. 3D, FIG. 4 and FIG. 5; please refer to the descriptions of these embodiments for details. If the inductor current IL continues flowing in a 5-to-1 mode, it is similar to the embodiment shown in FIG. 2A; if the inductor current IL continues flowing in a 4-to-1 mode, in a 3-to-1 mode or in a 2-to-1 mode, it is similar to the embodiment shown in FIG. 3A; if the inductor current IL continues flowing in a 3-level inductor switching mode, it is similar to the embodiment shown in FIG. 3C and the embodiment shown in FIG. 3D; if the inductor current IL continues flowing in a 2-level inductor switching mode, it is similar to the embodiment shown in FIG. 4 and the embodiment shown in FIG. 5. Please refer to the descriptions regarding the corresponding embodiments for details.

The present invention provides a switched capacitor voltage converter circuit as described above. Advantages of the present invention include: that by providing a flexible switching among M-to-1 mode, 2-level inductor switching mode and/or 3-level inductor switching mode and by the inductor current continuing flowing, the variation of the second voltage (output voltage) is in a much smaller range; that various different operation modes can provide different voltage conversion ratios; and that the resonant switched capacitor voltage converter if the present invention can automatically switch among various different operation modes.

The configuration and mechanism to convert the first voltage V1 to the second voltage V2 are also applicable to converting the second voltage V2 to the first voltage V1. To be more specific, the control circuit 201 can select a ratio of the first voltage V1 to the second voltage V2 according to the level of the second voltage V2 to generate the control signal, so that when the second voltage V2 is converted to the first voltage V1, the first voltage V1 is maintained within a second predetermined range. In the described embodiments, the control circuit 201 controls the switched capacitor converter 202 to operate in one of the 2-to-1 mode, the 3-to-1 mode, or the inductor switching mode according to the first voltage V1, so as to maintain the second voltage V2 within the first predetermined range. By similar configuration and mechanism, the control circuit 201 also can control the switched capacitor converter 202 to operate in one of the 2-to-1 mode, the 3-to-1 mode, or the inductor switching mode according to the second voltage V2, so as to maintain the first voltage V1 within the second predetermined range.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor voltage converter circuit, which is configured to convert a first voltage to a second voltage or convert the second voltage to the first voltage; the switched capacitor voltage converter circuit comprising:
a switched capacitor converter coupled between the first voltage and the second voltage; and
a control circuit, which is configured to generate a control signal for controlling the switched capacitor converter, so as to convert the first voltage to the second voltage or convert the second voltage to the first voltage;
wherein the switched capacitor converter includes:
at least two capacitors;
a plurality of switches, which are coupled to the at least two capacitors; and
at least one inductor;
wherein the control circuit is configured to select a ratio of the first voltage to the second voltage according to a level of the first voltage, so that the second voltage is maintained at a first predetermined range, and to generate the control signal accordingly, so as to convert the first voltage to the second voltage, or wherein the control circuit is configured to select the ratio of the first voltage to the second voltage according to a level of the second voltage, so that the first voltage is maintained at a second predetermined range, and to generate the control signal accordingly, so as to convert the second voltage to the first voltage;
wherein the control signal further includes: a charging operation signal and at least one discharging operation signal;
wherein in a charging process of a resonant operation mode, the charging operation signal is configured to control the plurality of switches, so that a series connection of the at least two capacitors and the at least one inductor is formed between the first voltage and the second voltage, to form a charging path and operate in the resonant operation mode;
wherein in at least one discharging process of the resonant operation mode, the at least one discharging operation signal is configured to control the plurality of switches, so that a series connection of each respective capacitor of the at least two capacitors and the at least one inductor is formed between the second voltage and a DC voltage level, to simultaneously or sequentially form a plurality of discharging paths and operates in the resonant operation mode;
wherein in the resonant operation mode, the charging operation signal and the at least one discharging operation signal have respective ON periods which do not overlap one another, so that the charging process and the at least one discharging process do not overlap each other;
wherein in the resonant operation mode, the charging process and the at least one discharging process are arranged in a repeated, alternating order, so as to convert the first voltage to the second voltage or convert the second voltage to the first voltage;
wherein said control signal further includes an inductor operation signal, which is configured to control the plurality of switches, so that the switched capacitor converter operates in an inductor switching mode, wherein one end of the at least one inductor is alternatingly coupled to the first voltage or to the DC voltage level, so as to convert the first voltage to the second voltage and maintain the second voltage within the first predetermined range or to convert the second voltage to the first voltage and maintain the first voltage within the second predetermined range;
wherein the inductor switching mode includes: a 2-level inductor switching mode or a 3-level inductor switching mode, and wherein the inductor operation signal includes: a 2-level inductor operation signal or a 3-level inductor operation signal;
wherein in the 2-level inductor switching mode, the 2-level inductor operation signal controls the plurality of switches, so that a voltage at the one end of the at least one inductor is periodically switched between the first voltage and the DC voltage level, so as to convert the first voltage to the second voltage or convert the second voltage to the first voltage;
wherein in the 3-level inductor switching mode, the 3-level inductor operation signal controls the plurality of switches, so that the voltage at the one end of the at least one inductor is periodically switched among the first voltage, ½-fold of the first voltage and the DC voltage level, so as to convert the first voltage to the second voltage or convert the second voltage to the first voltage; and
wherein the control circuit decides to control the switched capacitor converter to operate in one of, according to the first voltage: a 2-to-1 mode, a 3-to-1 mode, the 2-level inductor switching mode, or the 3-level inductor switching mode, so as to maintain the second voltage within the first predetermined range.

2. The switched capacitor voltage converter circuit of claim 1, wherein in the resonant operation mode and/or in the inductor switching mode, the control circuit reduces a duty ratio of one or more of: the charging operation signal, the discharging operation signal, or the inductor operation signal, so that when at least two of the plurality of switches are ON, an inductor current flowing toward the second voltage is in a first state and so that when all of the plurality of switches are OFF, the inductor current flowing through the at least one inductor continues flowing along at least one continuing current flow path and the inductor current flowing toward the second voltage is in a second state, wherein the at least one inductor performs inductive power conversion to switch between the first state and the second state.

3. The switched capacitor voltage converter circuit of claim 1, wherein the at least two capacitors include two capacitors, and wherein the resonant operation mode includes the 2-to-1 mode or the 3-to-1 mode;
  wherein the control circuit decides to control the switched capacitor converter to operate in the 2-to-1 mode or in the 3-to-1 mode according to the first voltage;
  wherein in the 2-to-1 mode, the control circuit controls the plurality of switches, so that in the charging process, one of the two capacitors and one corresponding inductor of the at least one inductor form the charging path and operate in the resonant operation mode and so that in the discharging process, the one of the two capacitors and the one corresponding inductor form the discharging path and operate in the resonant operation mode;
  wherein in the 3-to-1 mode, the control circuit controls the plurality of switches, so that in the charging process, the two capacitors and one corresponding inductor of the at least one inductor form the charging path and operate in the resonant operation mode and so that in the discharging process, the two capacitors and the one corresponding inductor form the discharging path and operate in the resonant operation mode;
  wherein in the 2-to-1 mode, the first voltage is 2-fold of the second voltage, and wherein in the 3-to-1 mode, the first voltage is 3-fold of the second voltage.

4. The switched capacitor voltage converter circuit of claim 3, wherein the control circuit decides to control the switched capacitor converter to operate in one of, according to the first voltage: the 2-to-1 mode, the 3-to-1 mode, or the inductor switching mode, so as to maintain the second voltage within the first predetermined range.

5. The switched capacitor voltage converter circuit of claim 1, wherein the switched capacitor voltage converter includes: a series-parallel switched capacitor converter.

6. The switched capacitor voltage converter circuit of claim 5, wherein the series-parallel switched capacitor converter includes: a 2-to-1 series-parallel switched capacitor converter, a 3-to-1 series-parallel switched capacitor converter, a 4-to-1 series-parallel switched capacitor converter or 5-to-1 series-parallel switched capacitor converter.

7. The switched capacitor voltage converter circuit of claim 1, wherein the DC voltage level is a ground level.

8. The switched capacitor voltage converter circuit of claim 1, wherein the control circuit includes:
  a current sensing circuit, which is configured to sense a current flowing through the at least one inductor, to generate at least one current sensing signal; and
  a control signal generation circuit coupled to the current sensing circuit, wherein the control signal generation circuit is configured to generate the control signal according to the at least one current sensing signal.

9. The switched capacitor voltage converter circuit of claim 8, wherein the control circuit further includes:
  a voltage sensing circuit, which is configured to sense the second voltage or the first voltage, to generate a voltage sensing signal;
  wherein in the inductor switching mode, the control signal generation circuit is configured to generate the inductor operation signal further according to the voltage sensing signal.

10. The switched capacitor voltage converter circuit of claim 1, wherein the at least two capacitors include N capacitors, and wherein the resonant operation mode includes a M-to-1 mode, wherein N is a natural number greater than three, and wherein M is a natural number greater than two and smaller than and equal to N+1;
  wherein the control circuit determines a value of M according to the first voltage and the control circuit decides to control the switched capacitor converter to operate in the M-to-1 mode accordingly;
  wherein in the M-to-1 mode, the control circuit controls the plurality of switches, so that in the charging process, M−1 capacitors and one corresponding inductor form the charging path and operate in the resonant operation mode and so that in the discharging process, the M−1 capacitors and the one corresponding inductor form the discharging path and operate in the resonant operation mode.

11. A switched capacitor voltage conversion method configured to convert a first voltage to a second voltage or convert the second voltage to the first voltage of a switched capacitor voltage converter, wherein the switched capacitor converter includes: at least two capacitors; a plurality of switches, which are coupled to the at least two capacitors; and at least one inductor; the switched capacitor voltage conversion method comprising:
  selecting a ratio of the first voltage to the second voltage according to a level of the first voltage, so that the second voltage is maintained at a first predetermined range, and generating a control signal accordingly, so as to convert the first voltage to the second voltage, or selecting the ratio of the first voltage to the second voltage according to a level of the second voltage, so that the first voltage is maintained at a second predetermined range, and generating the control signal accordingly, so as to convert the second voltage to the first voltage;
  wherein in a charging process of a resonant operation mode, a charging operation signal controls the plurality of switches, so that a series connection of the at least two capacitors and the at least one inductor is formed between the first voltage and the second voltage, to form a charging path and operate in the resonant operation mode;
  wherein in at least one discharging process of the resonant operation mode, the at least one discharging operation signal controls the plurality of switches, so that a series connection of each respective capacitor of the at least two capacitors and the a least one inductor is formed between the second voltage and a DC voltage level, to simultaneously or sequentially form a plurality of discharging paths and operate in the_resonant operation mode;
  wherein in the resonant operation mode, the charging operation signal and the at least one discharging operation signal have respective ON periods which do not overlap one another, so that the charging process and the at least one discharging process do not overlap each other;
  wherein in the resonant operation mode, the charging process and the at least one discharging process are arranged in a repeated, alternating order, so as to convert the first voltage to the second voltage or convert the second voltage to the first voltage;

wherein in an inductor switching mode, controlling the plurality of switches via an inductor operation signal, wherein one end of the at least one inductor is alternatingly coupled to the first voltage or to the DC voltage level, to thereby convert the first voltage to the second voltage and maintain the second voltage within the first predetermined range or to thereby convert the second voltage to the first voltage and maintain the first voltage within the second predetermined range;

wherein the inductor switching mode includes: a 2-level inductor switching mode or a 3-level inductor switching mode, wherein the inductor operation signal correspondingly includes: a 2-level inductor operation signal or a 3-level inductor operation signal;

wherein in the 2-level inductor switching mode, the 2-level inductor operation signal controls the plurality of switches, so that a voltage at the one end of the at least one inductor is periodically switched between the first voltage and the DC voltage level, so as to convert the first voltage to the second voltage or convert the second voltage to the first voltage;

wherein in the 3-level inductor switching mode, the 3-level inductor operation signal controls the plurality of switches, so that the voltage at the one end of the at least one inductor is periodically switched among the first voltage, ½-fold of the first voltage and the DC voltage level, so as to convert the first voltage to the second voltage or convert the second voltage to the first voltage; and wherein the step of deciding whether the switched capacitor converter operates in the resonant operation mode or in the inductor switching mode includes: deciding to control the switched capacitor converter to operate in one of, according to the first voltage: a 2-to-1 mode, a 3-to-1 mode, the 2-level inductor switching mode, or the 3-level inductor switching mode, so as to maintain the second voltage within the first predetermined range.

12. The switched capacitor voltage conversion method of claim 11, further comprising:

in the resonant operation mode or in the inductor switching mode, reducing a duty ratio of one or more of: the charging operation signal, the discharging operation signal, or the inductor operation signal, so that when at least two of the plurality of switches are ON, an inductor current flowing toward the second voltage is in a first state and so that when the plurality of switches are OFF, the inductor current flowing through the at least one inductor continues flowing along at least one continuing current flow path and the inductor current flowing toward the second voltage is in a second state, wherein the at least one inductor performs inductive power conversion to switch between the first state and the second state.

13. The switched capacitor voltage conversion method of claim 11, wherein the at least two capacitors include two capacitors, and wherein the resonant operation mode includes the 2-to-1 mode or the 3-to-1 mode; the switched capacitor voltage conversion method further comprising:

deciding whether the switched capacitor converter operates in the 2-to-1 mode or in the 3-to-1 mode according to the first voltage;

wherein in the 2-to-1 mode, the plurality of switches are controlled so that in the charging process, one of the two capacitors and one corresponding inductor of the at least one inductor form the charging path and operate in the resonant operation mode and so that in the discharging process, the one of the two capacitors and the one corresponding inductor form the discharging path and operate in the resonant operation mode;

wherein in the 3-to-1 mode, the plurality of switches are controlled so that in the charging process, the two capacitors and one corresponding inductor of the at least one inductor form the charging path and operate in the resonant operation mode and so that in the discharging process, the two capacitors and the one corresponding inductor form the discharging path and operate in the resonant operation mode;

wherein in the 2-to-1 mode, the first voltage is 2-fold of the second voltage, and wherein in the 3-to-1 mode, the first voltage is 3-fold of the second voltage.

14. The switched capacitor voltage conversion method of claim 13, wherein the step of deciding whether the switched capacitor converter operates in the resonant operation mode or in the inductor switching mode includes:

deciding to control the switched capacitor converter to operate in one of, according to the first voltage: the 2-to-1 mode, the 3-to-1 mode, or the inductor switching mode, so as to maintain the second voltage within the first predetermined range.

15. The switched capacitor voltage conversion method of claim 11, wherein the switched capacitor voltage converter includes: a series-parallel switched capacitor converter.

16. The switched capacitor voltage conversion method of claim 15, wherein the series-parallel switched capacitor converter includes: a 2-to-1 series-parallel switched capacitor converter, a 3-to-1 series-parallel switched capacitor converter, a 4-to-1 series-parallel switched capacitor converter or 5-to-1 series-parallel switched capacitor converter.

17. The switched capacitor voltage conversion method of claim 11, wherein the DC voltage level is a ground level.

18. The switched capacitor voltage conversion method of claim 11, further comprising:

sensing a current flowing through the at least one inductor, to generate at least one current sensing signal; and generating the charging operation signal, the least one discharging operation signal and the inductor operation signal according to the at least one current sensing signal.

19. The switched capacitor voltage conversion method of claim 18, further comprising:

sensing the second voltage or the first voltage, to generate a voltage sensing signal; and in the inductor switching mode, generating the inductor operation signal further according to the voltage sensing signal.

20. The switched capacitor voltage conversion method of claim 11, wherein the at least two capacitors include N capacitors, and wherein the resonant operation mode includes a M-to-1 mode, wherein N is a natural number greater than three, and wherein M is a natural number greater than two and smaller than and equal to N+1; the switched capacitor voltage conversion method further comprising:

determining a value of M according to the first voltage and deciding to control the switched capacitor converter to operate in the M-to-1 mode; and in the M-to-1 mode, controlling the plurality of switches, so that in the charging process, the M−1 capacitors and one corresponding inductor form the charging path and operate in the resonant operation mode and so that in the discharging process, the M-1 capacitors and the one corresponding inductor form the discharging path and operate in the resonant operation mode.

* * * * *